Figure 1:
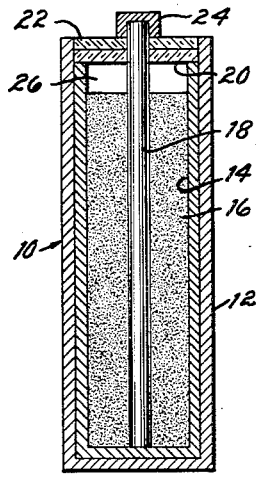

May 27, 1958 C. K. MOREHOUSE ET AL 2,836,645
PRIMARY CELL
Filed June 13, 1956

INVENTOR.
CLARENCE K. MOREHOUSE
& RICHARD GLICKSMAN
BY
ATTORNEY

United States Patent Office 2,836,645
Patented May 27, 1958

2,836,645

PRIMARY CELL

Clarence K. Morehouse, Princeton, and Richard Glicksman, Highland Park, N. J., assignors to Radio Corporation of America, a corporation of Delaware Application June 13, 1956, Serial No. 591,241

15 Claims. (Cl. 136—137)

This invention relates to primary cells, and particularly, but not necessarily exclusively, to improved primary cells including a magnesium anode and a cathode comprising a quinone organic compound.

Primary cells are electrochemical devices from which stored chemical energy is converted directly into electrical energy by an electrochemical process. Generally, the term primary cells refers to a class of cells that do not have efficiently reversible chemical reactions. Once the chemical energy is converted to electrical energy, the cells are discarded. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply should have the following characteristics: a high watt-hour and a high ampere-hour capacity per unit of volume or weight; a high flat operating voltage over a wire range of current drains; a long life; and a low cost.

One problem in present day primary cells is that they include materials which come into short supply in times of emergency because the materials become critical to the interests of the United States as a whole. These materials may become critical because they are supplied from foreign sources or because domestic ore sources are limited in size and mining capacity, or for some other economic reason.

Accordingly, an object of this invention is to provide primary cells which are comparatively inexpensive to manufacture, have a high watt-hour and a high ampere-hour capacity per unit of volume or weight, and have a relatively high flat operating voltage level over a wide range of current drains.

A further object is to provide an improved electrochemical system which may be employed for primary cells.

Another object is to provide improved primary cells including materials which are non-strategic, can be readily available in large quantities in the United States, and are comparatively inexpensive.

In general, the foregoing objects are accomplished in improved primary cells of the invention which include an anode selected from the group consisting of magnesium and magnesium base alloys and a cathode including an organic oxidizing substance in which the oxidizing properties are due at least in part to the presence of a quinoid structure in said substance. The invention includes reserve cells comprising the foregoing combination and adapted to supply electrical energy upon the addition of an electrolyte.

Figure 2:
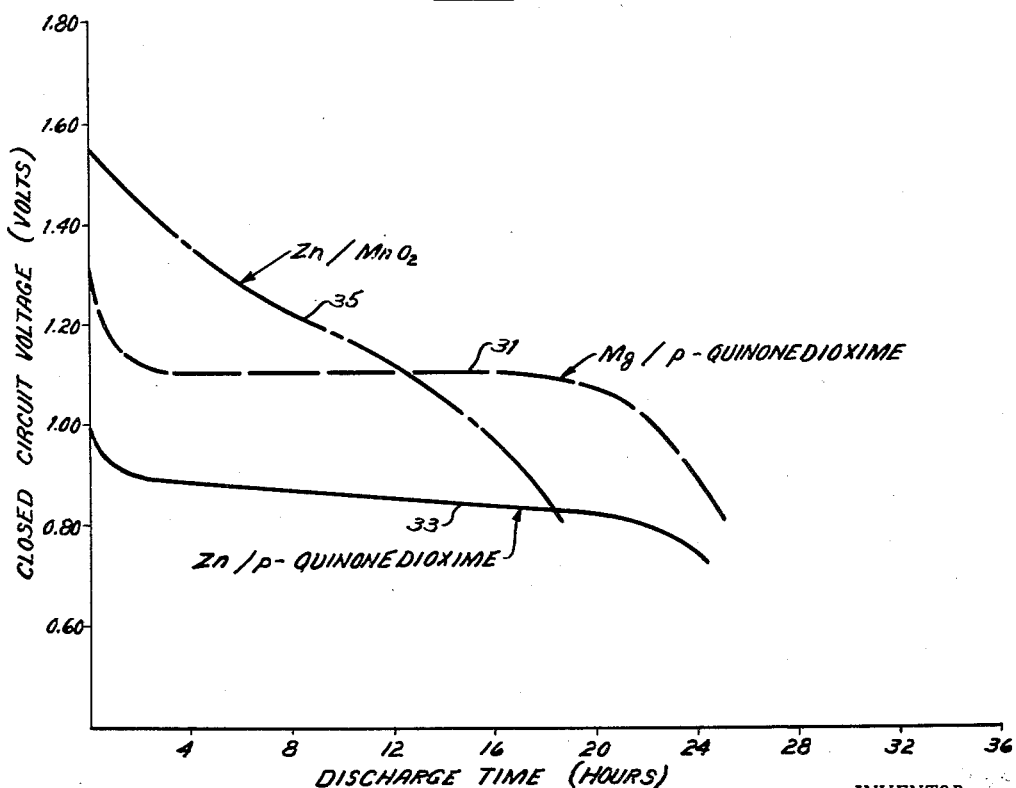

The invention is described in greater detail by reference to the drawing wherein:

Figure 1 is a sectional, elevational view of a typical dry cell of the invention, and Figure 2 is a family of curves showing the change in cell voltage with respect to discharge time of an "AA" size dry cell of the invention compared with comparable dry cells from other electrochemical systems when discharged continuously through a 50 ohm resistance.

Example 1.—referring to Figure 1, a dry cell 10 according to the invention may be prepared as follows. A metallic anode 12 is provided in the form of a cup of the standard "AA" size (American Standards Association, Bureau of Standards, Washington, D. C.). The anode 12 has the approximate composition 98.4% magnesium, 1.0% aluminum, 0.5% zinc and 0.1% calcium. This alloy is sometimes designated AZ10A. The anode 12 is lined with a separator 14 comprising an absorbent kraft paper. The separator 14 keeps the anode 12 and a cathode 16 apart while providing therebetween a low resistance path to the flow of ions during the electrochemical process.

A mix including the cathode material and electrolyte, hereinafter referred to as the cathode mix, is prepared of the following constituents:

24 grams p-quinonedioxime
12 grams acetylene black
1 gram barium chromate
25 ml. an aqueous solution containing 500 grams of $MgBr_2 \cdot 6H_2O$ and 1 gram $Li_2CrO_4 \cdot 2H_2O$ per liter of water Approximately 5 grams of the cathode mix is formed to a cylindrical slug and inserted into the paper lined anode 12 to form a cathode 16. A carbon rod 18 is inserted into the mix 16 to provide electrical connection thereto. The anode 12 is sealed by an insulating washer 20 mounted on the carbon rod and a layer 22 of hard wax on the washer. A metal contact cap 24 of brass is placed on rod 18. An air space 26 is provided between the washer 20 and the cathode 16.

The anode 12 and cathode 16 may now be connected through an external load whereby the cell commences to be discharged by electrochemical action. The cell reactions are believed to occur as follows:

Anode reaction $$3Mg \longrightarrow 3Mg^{++} + 6e^-$$

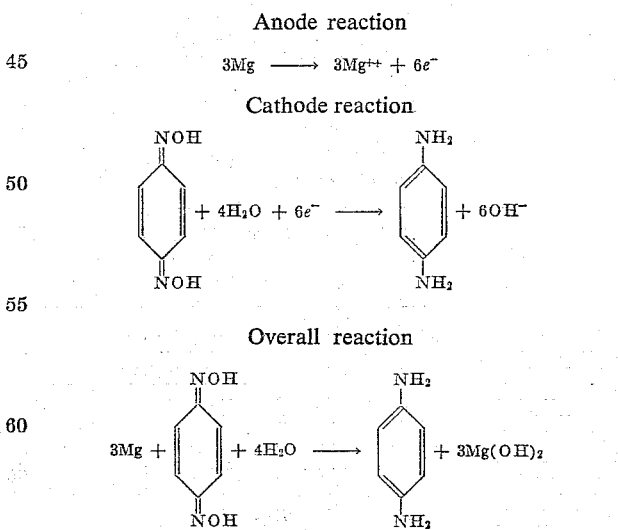

Cathode reaction

Overall reaction

Figure 2 shows characteristic initial discharge curves for "AA" size dry cells discharged continuously through a 50 ohm load resistance (simulating the current drain requirements of a transistor operated portable radio). Curve 31 shows the characteristic discharge curve for a cell prepared according to Example 1 containing p-quinonedioxime as the cathode material and a magnesium anode (magnesium/p-quinonedioxime). Curve 33 shows the discharge curve for a similar zinc/p-quinonedioxime cell discharged under the same conditions. For comparison, curve 35 shows the characteristic discharge curve for a similar commercially-available zinc/manganese dioxide dry cell discharged under the same conditions. The dry cell of Example 1 exhibits a flatter voltage curve than prior cells resulting in more uniform performance of the equipment which is supplied with electric power. Also, the dry cell of Example 1 supplies electric power for a longer period of time to a 0.9 volt cutoff. This cutoff voltage represents the practical voltage below which portable electronic equipment ordinarily becomes inoperative.

In addition to its favorable performance, the cell of Example 1 has the great advantage that it employs non-strategic, plentiful materials which are relatively easy to manufacture in the United States, and when manufactured in large quantities, should be relatively inexpensive. Magnesium may be obtained from sea water and the p-quinonedioxime may be produced synthetically.

The primary cells of the invention comprise generally the following parts:

(1) An anode selected from the group of materials consisting of magnesium and magnesium-base alloys, (2) An electrolyte which may include (a) a soluble substance for increasing the electrical-conductivity thereof and (b) a material for inhibiting the corrosion of the anode, (3) A cathode including a depolarizer consisting of an organic oxidizing substance in which the oxidizing properties thereof are due at least in part to the presence of a quinoid structure in said substance. The cathode may include also an inorganic depolarizer, other organic depolarizers and/or an inorganic material for increasing the conductivity of the cathode.

*The anode.*—The anode for the primary cells of the invention may be magnesium or magnesium-base alloys. The term "magnesium anode" includes both magnesium and magnesium base alloy anodes. A magnesium-base alloy is one wherein the predominant ingredient is magnesium. Thus, any alloy having more than 50% magnesium is satisfactory. It is preferred, however, to have as high a proportion of magnesium as possible. Other ingredients are added to magnesium to improve the properties of the anode for fabrication purposes, to impart a greater degree of corrosion resistance, or for other reasons. Table I sets forth examples of magnesium-base alloys which are suitable for anode material together with the corresponding ASTM designations.

TABLE I

*Anode compositions*

| Alloy No. | A. S. T. M. Designation | Nominal Composition [1] | | | | | |
|---|---|---|---|---|---|---|---|
| | | Al | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10.0 | 0.1 | | | | |
| 5 | A12 | 12.0 | 0.1 | | | | |
| 5a | A10A | 1.0 | | 0.5 | | | 0.10 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 9.0 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | Z1 | | | 1.0 | | | |

[1] Balance commercial magnesium.

The magnesium anode may be the container for the cell, may be the lining of the container, or may be a separate structure inserted in the container. The magnesium anode may be in any geometrical configuration desired.

It is necessary to space the cathode and anode from one another. To accomplish this, it is preferred to insert a separator between the anode and the cathode regardless of configuration, although other methods of spacing may be used. The separator may be any porous material such as kraft paper, kraft paper treated with a gel-like material such as carboxymethyl cellulose, polyvinyl alcohol, or a starch-flour gel. The coating on the kraft paper promotes adhesion of the paper to the anode and maintains good electrical contacts between the electrolyte and the anode. Porous ceramics or other inorganic or organic structures may be used in place of paper.

*The electrolyte.*—The electrolyte may be an aqueous solution containing a soluble salt such as sea water, or water to which one or more soluble salts have been deliberately added. Bromides of alkali metals, alkaline earth metals, and ammonium cations are the most desirable soluble salts in the electrolyte. The electrolyte may be prepared by dissolving the salt in water in a concentration between about 30 grams per liter and that producing a saturated solution at ordinary temperatures. The concentration does not appear to be critical, although for best results certain concentrations are to be preferred depending upon the particular salt or combination of salts that are to be used. For example, preferred concentrations of the alkaline earth metal bromides (hydrated) are from about 150 to 600 grams, preferably 500 grams, of the hydrated salt per liter of water. While a single salt may be used as the electrolyte, combinations of salts, particularly combinations of alkali metal bromides with alkaline earth metal bromides are desirable. Examples of soluble salts that may be added to the electrolyte are lithium bromide, sodium bromide, magnesium bromide, magnesium chloride, strontium bromide, calcium bromide, and ammonium bromide.

It is also desirable to include in the electrolyte one or more alkali metal, alkaline earth metal (including magnesium), or ammonium salts of chromic acid in corrosion-inhibiting amounts. The chromic acid salts may be used in proportions between 0.01 gram per liter of solution to concentrations producing saturation in the presence of the electrolyte salt obtained therein. A preferred concentration of lithium chromate is about 0.05 to 2.0 grams per liter of solution. Examples of corrosion-inhibiting salts are sodium chromate, ammonium chromate, potassium dichromate, lithium dichromate, magnesium chromate, calcium chromate.

For certain applications, principally where a long shelf life is required, it is desirable to omit one of the essential components util the need for electrical energy has arisen. The primary cells of the invention are particularly adaptable to be prepared as reserve cells, for example, by omitting the electrolyte until just prior to use.

*The cathode.*—The cathode includes an organic oxidizing substance in which the oxidizing properties are due at least in part to the presence of a quinoid structure in said substance. These substances are also referred to as quinone organic compounds. During the electrochemical action, the substance undergoes a reduction as the primary cell furnishes electric current. The quinone organic compounds which are insoluble in conventional electrolytes are particularly suitable for use as cathode materials in dry cells. Quinone organic compounds soluble in the cell electrolyte may be used in reserve cells.

The following list includes some of the quinone organic compounds which are useful in preparing primary cells according to the invention. The members of the list are intended as examples only.

Para-benzoquinone and its derivatives:
  p-benzoquinone
  2,5 dichloro-p-quinone
  2,6 dichloro-p-quinone
  quinhydrone
  p-toluquinone
  tetrachloro-p-benzoquinone
  2-chloro-p-quinone
  2-phenyl-1,4-benzoquinone
  sodium nitranilate
Ortho-benzoquinone and its derivatives:
  o-benzoquinone
  tetrachloro-o-benzoquinone
  tetrabromo-o-benzoquinone
Diphenoquinone and its derivatives:
  diphenoquinone
  2-chlorodiphenoquinone
Alpha and beta naphthoquinones and their derivatives:
  1,4 naphthoquinone
  1,2 naphthoquinone
  4 methyloxy-1,2-naphthoquinone
  2 methyloxy-1,4-naphthoquinone
  3-nitro-1,2-naphthoquinone
  silver salt of 2-hydroxy-1,4 naphthoquinone
Anthraquinone and its derivatives:
  anthraquinone
  1,8 dihydroxyanthraquinone
  1,4 dihydroxy-2-anthraquinonesulfonic acid
  5-nitro-1-anthraquinonesulfonic acid
Phenanthrenequinone and its derivatives:
  phenanthrenequinone
  2-nitrophenanthrenequinone
Para-quinoneimine and its derivatives:
  p-quinoneimine
  N,2,6 trichloro-p-quinoneimine
  N-chloro-p-quinoneimine
  p-quinonemonoanil
Para-quinonediimine and its derivatives:
  p-quinonediimine
  N,N' dichloroquinonediimine
  phenylene blue
Quinonemonooxime and its derivatives:
  p-quinonemonooxime
Quinonedioxime and its derivatives:
  p-quinonedioxime Any quinone organic compound may be used in the cathodes of the primary cells of the invention. The primary cells of the invention all utilize the electron change obtained in converting a quinoid compound to a benzenoid compound by a structural rearrangement. This is shown schematically by the following equation:

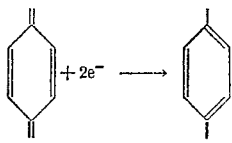

In addition, such compounds may have other radicals in their structure which alter their physical and chemical properties to affect the stability and solubility in the electrolyte. It is also recognized that by changing the structure of the quinone organic compounds, the theoretical capacity, shelf life and the rate at which electric energy can be withdrawn from the cell can be altered. The selection of the particular compound and its structure will depend on the application for which the particular primary cell is intended.

Substituent groups often exert a marked influence on the oxidation-reduction potential in either a positive or negative sense. Meta-directing groups, such as —$NO_2$, —CN, —$SO_2Ar$, —COAr, —COOH, —Cl, and —$SO_3H$, raise the potential of the parent quinone, whereas a potential lowering effect is exerted by the following groups, arranged approximately in order of decreasing effectiveness: —NHR, —$NH_2$ —$N(CH_3)_2$, —OH, —OR, —$CH_3$, —$NHCOCH_3$, —$C_6H_5$, —$OCOCH_3$. The relationships are those expected from the course of aromatic substitutions. Strongly unsaturated groups and halogen atoms are electron-attracting and tend to increase the attractive power of the system terminating in the oxygen atoms for external electrons, the acquisition of which converts the quinone into hydroquinone. Amino, hydroxyl, alkyl, and other electron-repelling substituents decrease affinity for electrons and hence lower the potential.

The cathodes of the primary cells of the invention may also comprise a mixture of one or more quinone organic compounds, or a mixture with one or more other organic oxidizing compounds, such as nitro organic compounds, or a mixture with inorganic cathode materials such as manganese dioxide or the like.

For many situations, it is desirable to increase the electrical conductivty of the cathode. One may add varying proportions of non-reactive conductive materials to obtain the desired electrical conductivity. Carbon is a preferred material for this purpose because of its low cost and easy availability. Any of the various forms of carbon, such as graphite, or acetylene black may be used. The conducting material may comprise up to 80% by weight of the cathode mix.

The cathodes of the invention may be fabricated by a number of methods and in various shapes. Example 1 describes preparing a mixture of powders with electrolyte and then pressing a quantity of the mixture to the desired shape and density. Another cathode mix may include a binder such as polyvinyl alcohol, carboxymethylcellulose, methylcellulose, a vinyl resin, bentonite or silica gel. Such mix may be pressed as described above, or cast in a mold to fabricate the cathode. The binder adds strength and rigidity to the cathode especially where odd shapes are used. A cathode mix containing a binder may be coated on a suitable support such as a carbon rod or block and used in layer form. Besides simple coatings, films containing the cathode mix may also be prepared by the addition of a film-forming material to the cathode mix and using techniques well-known in the plastics art. One technique is to coat paper separator sheets with magnesium powder in a binder on one surface and the cathode mix in a binder on the other surface. The coated sheets may then be stacked and stamped to produce batteries of the desired voltage and geometry.

In some cases, it is desirable to increase the amount of active surface on the cathode. One method for increasing the active surface is to add a proportion of a soluble material, such as sodium chloride, to the cathode mix before fabrication. Upon fabrication, the soluble material is dissolved out of the cathode leaving a somewhat porous structure with a greatly increased proportion of active surface.

The presence of atmospheric oxygen enhances the capacity of the cathodes of cells of various kinds. For example, capacity increases can be realized in the cell of Example 1 by providing a small vent (e. g. 0.05" in diameter) in the wax layer 22, or by preparing a tab on the washer 20 which tab extends up through the wax layer 22. The maximum effect is ordinarily obtained when the drain is relatively light.

It is noteworthy that the materials used to fabricate the cells of the invention may all be produced in the United States by processes well known in the chemical arts. Magnesium may be produced from sea water which is in abundant supply in the United States. The quinone organic compounds may be produced synthetically and many such substances such as p-quinonedioxime, are commercially available at the present time. Graphite and acetylene black are also available from sources within the United States.

*Example 2.*—Another dry cell according to the invention may be prepared according to Example 1 except that the cathode mix has the following formulation:

16.3 grams N,2,6-trichloro-p-quinoneimine
8.15 grams acetylene black
0.9 gram BaCrO₄
25 ml. of an aqueous solution containing 500 grams of MgBr₂·6H₂O and 1.0 gram Na₂Cr₂O₇·2H₂O per liter of water

*Example 3.*—Another dry cell according to the invention may be prepared according to Example 1 except that the cathode mix has the following formulation:

20 grams 2,5 dichloroquinone
2.5 grams acetylene black
11 ml. of an aqueous solution containing 500 grams of MgBr₂·6H₂O and 1.0 gram Li₂CrO₄·2H₂O per liter of water

*Example 4.*—Another dry cell according to the invention may be prepared according to Example 1 except that the cathode mix has the following formulation:

20 grams ortho-benzoquinone
10 grams acetylene black
0.9 gram BaCrO₄
21 ml. of an aqueous solution containing 500 grams of MgBr₂·6H₂O and 1.0 gram Li₂CrO₄·2H₂O per liter of water

*Example 5.*—Another dry cell according to the invention may be prepared according to Example 1 except that the cathode mix has the following formulation:

25 grams 2-nitro-1,2-naphthoquinone
12.5 grams acetylene black
0.8 gram BaCrO₄
26 ml. of an aqueous solution containing 500 grams of MgBr₂·6H₂O and 1.0 gram Li₂CrO₄·2H₂O per liter of water

*Example 6.*—Another dry cell according to the invention may be prepared according to Example 1 except that the cathode mix has the following formulation:

20 grams diphenoquinone
20 grams manganese dioxide
15 grams acetylene black
45 ml. of an aqueous solution containing 500 grams of MgBr₂·6H₂O and 1.0 gram Li₂CrO₄·2H₂O per liter of water

*Example 7.*—Another dry cell according to the invention may be prepared according to Example 1 except that the cathode mix has the following formulation:

20 grams 2-chloro-p-quinone
20 grams meta-dinitrobenzene
40 grams Darco G–60 carbon black
10 grams acetylene black
93 ml. of an aqueous solution containing 500 grams of MgBr₂·6H₂O and 1.0 gram Li₂CrO₄ per liter of water

*Example 8.*—A flat reserve cell may be prepared by first mixing the following formulation:

10 grams N,N' dichloro-p-quinonediimine
5 grams acetylene black
26 ml. solution containing 5% by weight of collodion in ether Paste a quantity of the cathode formulation to a graphite plate about 1.25" x 1.00" x 0.0625" thick and weighing about 2.0 grams. The cathode assembly is dried, wrapped with a piece of salt-free kraft paper, and then wrapped with a piece of magnesium sheet about 3.0' x 1.0' x 0.010" thick and weighing about 1.0 gram. When it is desired to use the cell, the entire assembly is immersed in an aqueous solution containing 500 grams MgBr₂·6H₂O and 1.0 gram Li₂CrO₄·2H₂O per liter of water.

There have been described improved primary cells which are inexpensive to manufacture and exhibit a high watt-hour and ampere-hour capacity per unit of volume or weight and a high flat operating voltage level over a wide range of current drains. The cells of the invention use materials which may be produced within the United States in large quantities by techniques well known in the chemical art.

What is claimed is:

1. In a primary cell, an anode selected from the group consisting of magnesium and magnesium base alloys, in combination with a cathode including a depolarizer consisting of an organic oxidizing substance in which the oxidizing properties of said substance are due at least in part to the presence of a quinoid structure in said substance.

2. A primary cell according to claim 1 wherein said anode comprises a magnesium base alloy.

3. A primary cell according to claim 1 wherein said cathode comprises a mixture of different organic oxidizing substances in which the oxidizing properties of at least one of said substances are due at least in part to the presence of a quinoid structure in said substances.

4. A primary cell according to claim 1 wherein said cathode includes an inorganic depolarizer.

5. A primary cell according to claim 1 wherein said cathode includes an inorganic material for increasing the electrical conductivity of said cathode.

6. A primary cell comprising a magnesium anode, an electrolyte, and a cathode including a depolarizer consisting of an organic oxidizing substance in which the oxidizing properties are due at least in part to the presence of a quinoid structure in said substance.

7. A primary cell according to claim 6 wherein said electrolyte is an aqueous solution having dissolved therein a substance selected from the group consisting of alkali metal bromides, alkaline earth metal bromides, and ammonium bromides.

8. A primary cell according to claim 6 wherein said electrolyte is an aqueous solution having dissolved therein a chromic acid salt of an anion selected from the group consisting of alkali bases, alkaline earth metal bases and ammonium bases.

9. A primary cell comprising a magnesium base alloy anode, an aqueous electrolyte having dissolved therein magnesium bromide and a chromate inhibitor, and a cathode comprising carbon and an organic oxidizing substance in which the oxidizing properties are due at least in part to the presence of a quinoid structure in said substance.

10. A primary cell including a magnesium anode, an aqueous electrolyte, and a cathode including p-quinonedioxime.

11. A primary cell including a magnesium anode, an aqueous electrolyte, and a cathode including N,N' dichloro-p-quinonediimine.

12. A primary cell including a magnesium anode, an aqueous electrolyte, and a cathode including diphenoquinone.

13. A primary cell including a magnesium anode, an aqueous electrolyte, and a cathode including p-quinonediimine.

14. A primary cell including a magnesium anode, an aqueous electrolyte, and a cathode including sodium nitranilate.

15. A reserve cell adapted to be used upon the addition of an electrolyte, said cell comprising a magnesium anode and, associated therewith, a cathode comprising a depolarizer consisting of an organic oxidizing substance in which the oxidizing properties are due at least in part to the presence of a quinoid structure in said substance.

References Cited in the file of this patent

UNITED STATES PATENTS 2,612,533    Blake  ---------------- Sept. 30, 1952

OTHER REFERENCES

Glasstone, S., and Hicklings, A.: "Electrolytic Oxidation and Reduction," D. Van Nostrand Co., New York, 1936, pages 26–27.